United States Patent [19]

Pace

[11] 4,275,545
[45] Jun. 30, 1981

[54] KELP BLADE HARVESTER

[76] Inventor: Dan R. Pace, P.O. Box 5083, Halifax, Nova Scotia, Canada, B3L 4M6

[21] Appl. No.: 126,692

[22] Filed: Mar. 3, 1980

[30] Foreign Application Priority Data

Mar. 14, 1979 [CA] Canada .................................. 323374

[51] Int. Cl.³ .......................................... A01D 44/00
[52] U.S. Cl. ............................................. 56/8; 56/9
[58] Field of Search ......................................... 56/8, 9

[56] References Cited

U.S. PATENT DOCUMENTS 2,677,926   5/1954   Washbourne et al. .................... 56/8
4,196,566   4/1980   Donnelley ................................ 56/8

FOREIGN PATENT DOCUMENTS

655667   8/1951   United Kingdom ........................... 56/9
687396   2/1953   United Kingdom ........................... 56/9

Primary Examiner—Paul J. Hirsch
Attorney, Agent, or Firm—Colton & Stone, Inc.

[57] ABSTRACT

A harvester for harvesting only the blade or lamina from a mature kelp plant uses a plurality of harvester mechanisms for movement through a kelp bed adjacent the sea bottom. Each mechanism has a pair of helically formed spindles parallel to each other for relative counter-rotation, the helices being of opposite hand. A kelp stipe, encountering the spindles is moved upwardly thereby to bring the attached lamina into a channel forward of the spindles, adjacent which channel a cutter is positioned. When the lamina starts to engage the spindles they separate slightly and operate a linkage which in turn actuates the cutter to sever the lamina. The severed laminae are collected in a basket connected to the harvesting mechanisms. By harvesting only the lamina the plant can regenerate a new lamina and it is possible to have repeated harvests from a single plant.

41 Claims, 16 Drawing Figures

KELP BLADE HARVESTER

The present invention relates to a harvester for a crop having a single leaf on a long stalk, and in particular to a harvester for kelp growing in a body water such as the sea.

BACKGROUND OF THE INVENTION

There have been many attempts in the past to devise an effective marine harvester for living plants of seaweed of the order Laminariales, i.e. kelp. Most of those previous attempts have resulted in apparatus which either pulls the complete plant from the sea bottom or severs the stalk or stipe of the plant for collection and processing. This is believed to be inefficient and wasteful since the major portion of the kelp plant is the leaf or lamina and, in many species, if only the lamina is severed from the plant it will regenerate a new lamina which will soon be available for harvest. Thus if only kelp laminae were harvested the kelp bed would be harvested again much sooner than if the stipes were severed and new plants were required to establish.

As examples of prior art seaweed or kelp harvesters, reference may be made to British Pat. No. 690,275 (Scottish Seaweed Research Association) of Apr. 15, 1953 which uses a plurality of hooks on an endless belt to engage and tear away the kelp from the sea bottom; and to U.S. Pat. No. 1,120,206 (S. A. Knapp) of Dec. 8, 1914 which uses a band saw arrangement to cut the stalks or stipes. Each of these patents shows apparatus which harvests more than is required and is hence inefficient to the point of representing a questionable investment when applied to kelp of the genus Laminaria or other genera of similar form.

There are some kelps such as the giant bladder kelp harvested off California which grow to the surface of the sea. These plants are harvested by cutting the frond about 4 feet from the surface. In this case there is no problem because new stipes issue from the holdfast which is far removed from the area harvested.

SUMMARY OF THE INVENTION

The kelp harvester of the present invention overcomes the problems of the prior art by removing and retaining only the major blade (or lamina) portion of a kelp plant without detrimentally affecting the plant's holdfast, stripe, or region of stipe and lamina initiation (the transition zone). The action of the present harvester permits regeneration of lamina following harvest, thereby allowing repeated harvest from a single plant.

The harvester of the present invention utilizes a basket to collect several laminae as the harvester moves through a kelp bed. The basket carries a plurality of individual, identical, harvester mechanisms. Movement of the harvester through the kelp bed induces kelp stipes to enter the harvester mechanisms each of which, in two embodiments of the invention, carries a pair of parallel rotatable spindles having helical surfaces of opposite hand. The stipe, as it engages the spindles effects rotation thereof and is carried upwardly thereby, primarily by the helical or worm configuration of the spindles and partly by the natural upwardly directed tension of the stipe. This upward movement of the stipe induces the lamina to enter a narrow generally vertical channel positioned forwardly of the spindles adjacent which are cutter means. Continued forward motion of the harvester brings the base of the lamina into contact with the spindles and causes a slight separation of the spindles. This separation effects actuation of the cutter means through an appropriate linkage so as to sever the lamina at a desired distance from the stipe. The severed lamina is then collected by the basket as the harvester continues across the kelp bed.

In some instances, as with kelp such as *Laminaria hyperborea* found off the western coast of Europe, the stipe is very rigid. Since the spindles aforementioned are primarily provided to assist the passage of kelp laminae into the channel ahead of the cutter, their effectiveness with rigid-stiped kelp is diminished and, in fact, the spindles can be eliminated when harvesting such kelp. If a harvester is constructed without spindles, a pair of closely juxtaposed rollers replace the spindles and when the kelp lamina passes between the rollers, the rollers separate to effect actuation of the cutter means as above to sever the lamina from the stipe. This construction will also work, although less effectively than a construction using spindles, for kelp having a more flexible stipe than the *Laminaria hyperborea*.

Broadly speaking, therefore in at least one embodiment the present invention provides a harvester for harvesting kelp laminae, the kelp including a holdfast fixed to the bottom of a body of water, a stipe and a lamina connected to the stipe by a transition zone, comprising: a basket having at least one open end for collecting harvested laminae; a plurality of harvesting mechanisms attached to the basket along a lower leading edge at the open end, each mechanism comprising: a frame; a pair of parallel rotatable generally upright shafts mounted in the frame, one end of one shaft being movable laterally relative to the other shaft; a spindle mounted on each shaft for rotation therewith, each spindle having a helical surface, the helices being of opposite hand; gear means connected to the shafts for ensuring opposite rotation of one spindle relative to the other spindle; cutter means mounted in the frame; and linkage means interconnecting the cutter means and the one end of the one shaft such that lateral movement thereof actuates the cutter means via the linkage means; whereby as the harvester moves along the sea bottom and a kelp stipe enters between the spindles, the stipe will contact the spindles and cause rotation of the spindles to move the stipe upwardly along the helical surfaces thereof, entrance of the kelp lamina between the spindles effecting the lateral movement of the one shaft to actuate the cutter means and hence sever the lamina a short distance above the transition zone, the severed lamina being collected in the basket.

The present invention may be also seen to encompass a harvester mechanism comprising: a frame; a pair of helical spindles; each mounted on a shaft adjacent each other in the frame; gear means connected to the shafts for ensuring opposite rotation of one spindle relative to the other spindle; one of the shafts being mounted in the frame so that one end of the one shaft is laterally movable relative to the other shaft; cutter means mounted in the frame; and linkage means interconnecting the cutter means and the one end of the one shaft whereby lateral movement of the one end of the one shaft actuates the cutter means through the linkage means.

In another embodiment, the present invention encompasses a harvester mechanism comprising: a frame; a pair of generally parallel, shafts rotatably mounted adjacent each other in the frame; a cylindrical roller mounted on one shaft in close justaposition to a cylindrical roller mounted on the other shaft; the one shaft being mounted in the frame so that one end of the one shaft is laterally movable relative to the other shaft; cutter means mounted in the frame; and linkage means interconnecting the cutter means and the one end of the one shaft whereby lateral movement of the one end of the one shaft actuates the cutter means through the linkage means.

DESCRIPTION OF THE PREFERRED EMBODIMENT

Figure 1:
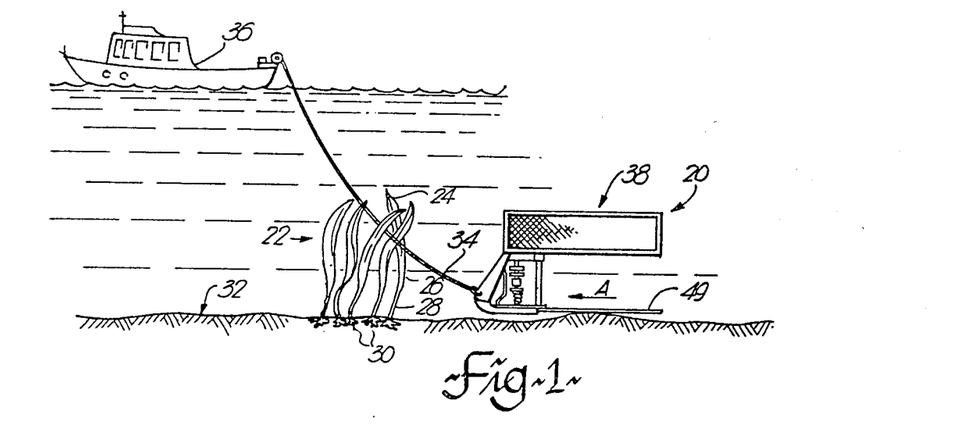
FIG. 1 is an overall view of the kelp harvester of the present invention shown in use in a kelp bed.

The kelp harvester of the present invention is depicted by reference number 20 in FIG. 1 in position approaching a kelp bed 22. It is particularly useful in the harvesting of laminae 24 from mature kelp plants so that the plants are not destroyed and so that new laminae may be grown. As seen in FIG. 1 each plant has a lamina 24 connected via transition zone 26 to a stipe or stalk 28 which in turn is anchored by a holdfast 30 to the sea bottom 32. The harvester is connected by a line 34 to a vessel 36 which draws the harvester along the sea bottom in the direction of the arrow A.

Figure 2:
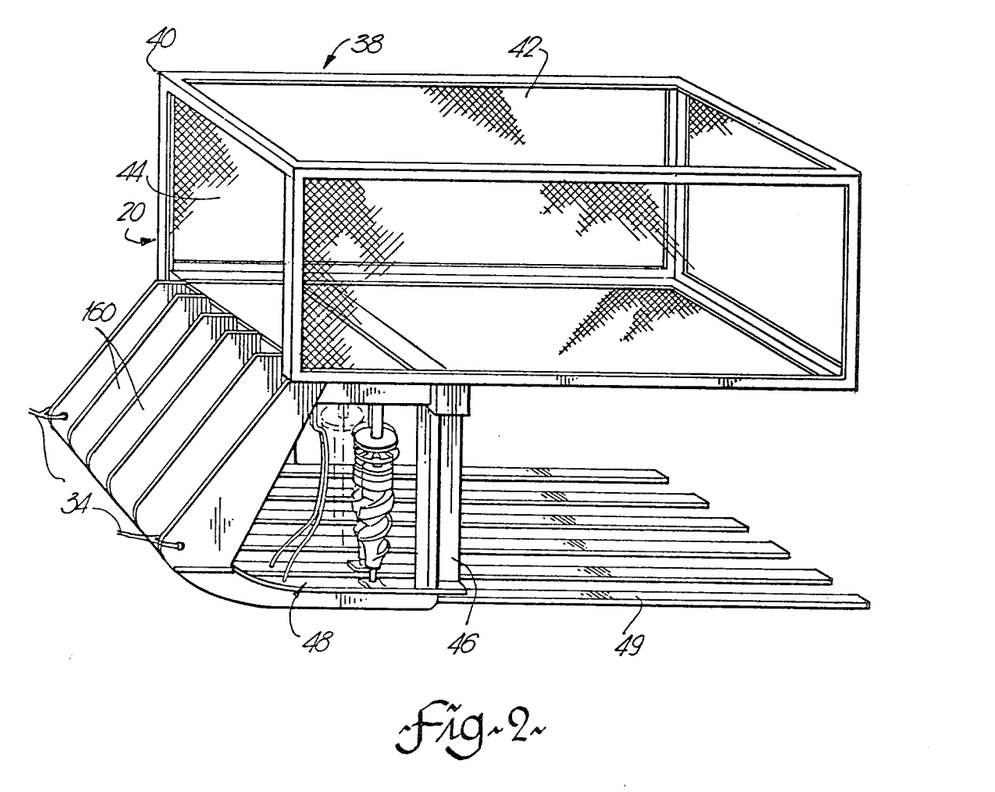
FIG. 2 is a perspective view of the kelp harvester.

According to FIG. 2 the harvester includes a basket 38 having a framework 40 with at least four sides thereof covered by mesh 42 and being open at the leading end 44.

The leading end of the harvester carries a plurality of harvesting mechanisms 48 to be described in detail hereinafter. A plurality of trailing skids 49 for supporting and stabilizing the harvester as it moves along the sea bottom is provided, and the line 34 connecting the harvester to the surface vessel 36 is attached to the leading portions of the mechanisms 48.

While FIG. 2 illustrates a plurality of harvester mechanisms extending across the harvester 20, only one such mechanism will be described in detail, it being remembered that any appropriate number of mechanisms may be attached to the basket 38.

Figure 3:
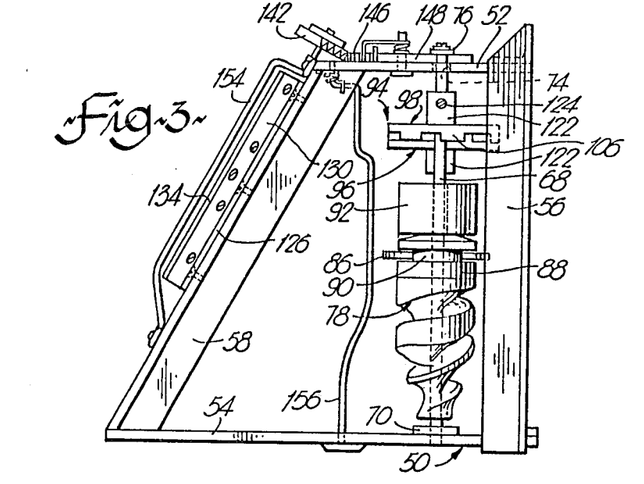
FIG. 3 is a side view of a harvester mechanism used in the kelp harvester.
Figure 4:
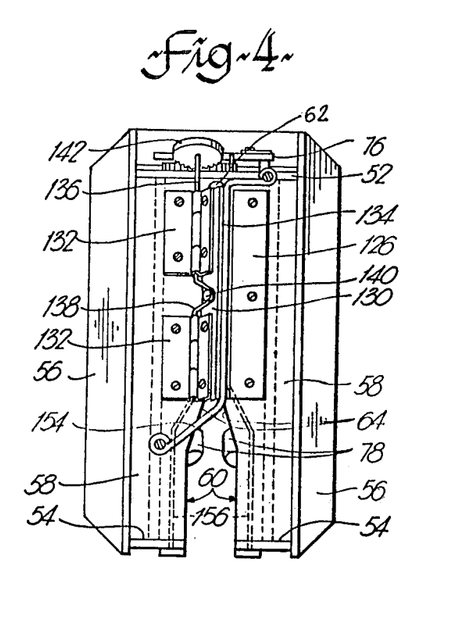
FIGS. 4, 5 and 6 (FIG. 6 appearing on the same sheet as FIG. 3) are respectively a front, back and top view of the harvester mechanism.

Turning now to FIGS. 3 through 13 the structure and operation of the harvesting mechanisms 48 will be described. FIG. 3 shows one such mechanism in elevation and it is seen that it includes a frame 50 which is generally trapezoidal in elevation having an upper portion 52, lower portions 54, rear portions 56 and forward portions 58, the portions 58 sloping forwardly and downwardly from the upper portion 52. It is noted that the lower frame portions 54 are spaced apart as are the forward frame portions 58 and rear frame portions 56. The spacing between the adjacent frame portions 54 is slightly greater than the diameter of a mature kelp stipe to permit the stipe to pass therethrough. As seen in FIG. 4 the forward frame portions 58 serve as an entrance guide for the stipes and they are spaced to define a first zone 60 of a width slightly greater than that of a mature kelp stipe, a second zone 62 of lesser width, approximating the thickness of a mature kelp lamina, and a convergence zone 64 connecting the first zone 60 to the second zone 62.

Mounted for rotation in the frame 50 is a pair of shafts 66, 68 each being mounted in a bushing 70, one on each of the lower frame portions 54. Shaft 66 is mounted at its upper end in a fixed bushing 72 in the upper plate 52 while the adjacent end of shaft 68 projects upwardly through a slot 74 in upper plate 52. The upper end of shaft 68 is rotatably mounted in a link 76 positioned above plate 52, the purpose of which will become apparent hereinafter. Slot 74 extends for a short distance transversely of frame 50, that is parallel to the open end of basket 38, thereby permitting slight lateral movement of the upper end of shaft 68 relative to the upright shaft 66.

Figures 5, 7:
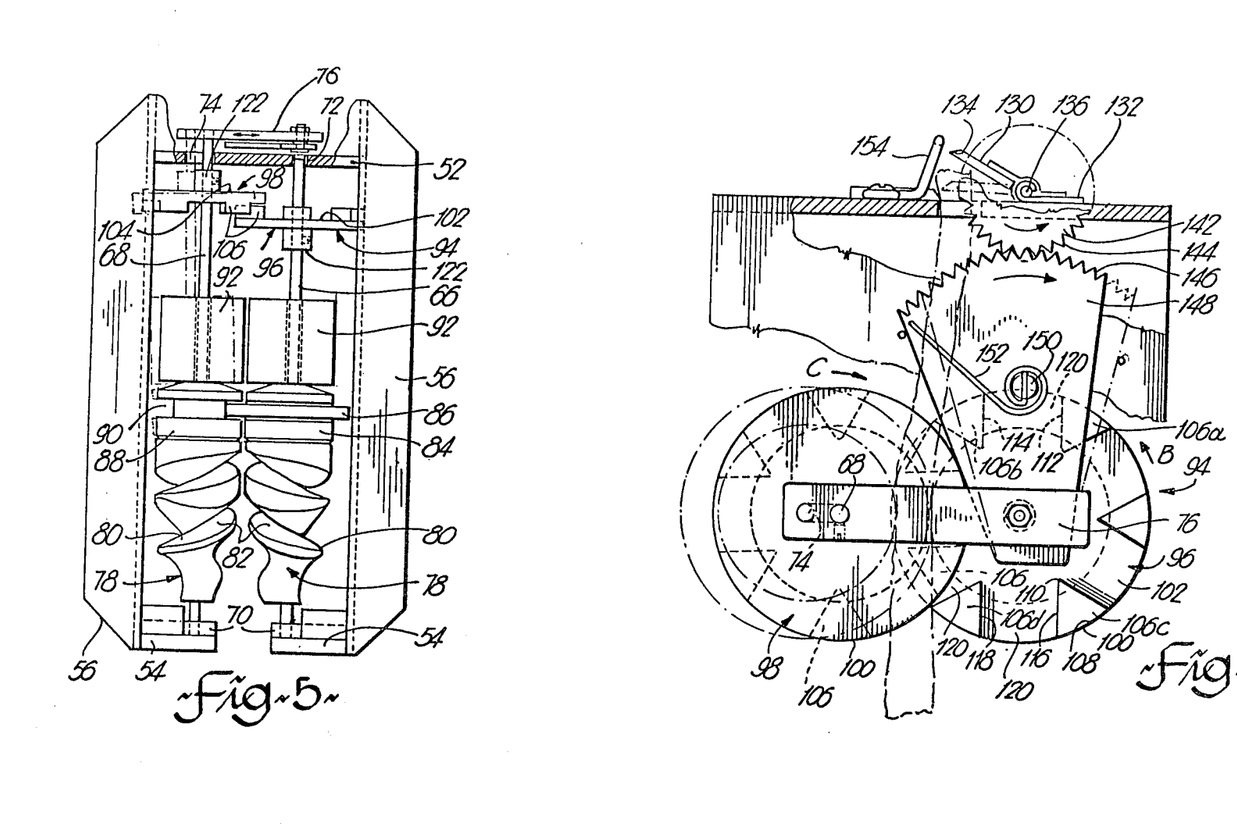
FIG. 7 is an enlarged view of the gear assembly used in the harvester mechanism.

Each of the shafts 66, 68 carries for rotation therewith a spindle 78, each spindle being formed of a soft flexible material which will not harm a kelp stipe but which when engaged by a stipe will cause rotation of the spindles and shafts due to the frictional engagement of the stipe with the spindles. As seen in FIG. 5 each spindle has a generally helical surface 80 which increases in diameter in an upward direction, the surface defining helical channels 82 therein. Also as seen in FIG. 5 the helices are of opposite hand.

Positioned on shaft 66 is a roller 84 which has at least one annular flange 86 projecting from the outer peripheral surface thereof. Positioned on shaft 68 is a corresponding roller 88 which has at least one annular recess 90 formed in the outer peripheral surface thereof. Rollers 84, 88 are axially slidable on their respective shafts and recess 90 is sized to receive flange 86 therein to aid in initiating lateral movement of shaft 68 as will become apparent hereinafter. Rollers 84, 88 may be produced from the same soft, flexible material as spindles 78.

Means for biasing each roller downwardly towards the upper surface of the adjacent spindle are provided. As illustrated, the means comprises a pair of lead weights 92, one of each being slidably received on an appropriate shaft 66, 68. It is understood of course that other biasing means, such as a helical spring (not shown) concentrically positioned on each shaft, could be used.

As best seen in FIGS. 3, 5 and 7 novel gear means 94 are provided, which gear means connect the shafts 66, 68 for conjoint rotation in opposite directions even though the lateral spacing between the shafts may vary. Referring to FIGS. 3, 5 and 7 the gear train includes a cylindrical plate 96 connected to shaft 66 and a cylindrical plate 98 connected to shaft 68, each plate having a peripheral surface 100 and opposed parallel radial surfaces 102, 104. Since the gear plates 96, 98 are identical only the plate 96 will be described in greater detail.

On the radial surface 102, plate 96 carries a plurality of spaced circumferential teeth 106. Each tooth is generally triangular in plan with one side 108 thereof lying along the periphery of the plate 96. The apex 110 of the triangular tooth lies on a radius of the plate. In order to better define the tooth configuration specific teeth are designated as 106a, 106b, 106c, 106d, the other teeth when considered in the same light exhibiting the same characteristics.

As shown in the plan view of FIG. 7 the teeth are arranged so that the adjacent sides 112, 114 of teeth 106a, 106b are parallel to each other and so that they are collinear with corresponding sides 116, 118 respectively of diametrically opposed pairs of adjacent teeth 106c, 106d. In essence each pair of adjacent teeth defines between the sides thereof a rectilinear slot 120 which is diametrically opposed to a slot 120 defined between opposed pairs of adjacent teeth. This configuration will of course apply when an even number of teeth is spaced around the gear plate.

When the gear plates 96, 98 are mounted to their respective shafts 66, 68 they are positioned so that the radial surface 102 of plate 96 faces the surface 102 of the plate 98. Also, the diameter of the plates is such that a portion of plate 98 will overly a portion of plate 96 so that the teeth of the two plates will be in meshing engagement. Thus as seen in FIG. 7, a tooth 106 of plate 96 will be positioned in a slot 120 of plate 98. As one gear plate rotates, as in the direction shown by arrow B, the other plate, through successive engagement of the teeth 106 with successive slots 120, will rotate in the direction shown by arrow C.

Since, in the present invention, there will be a small amount of lateral movement of shaft 68 relative to shaft 66 it is important that there be no cessation of the relative rotations of the two shafts. The construction of the gears utilized in the present invention accommodates such lateral movement in view of the extensive lateral overlap between the teeth on the two gear plates 96, 98. Hence, if shaft 68 is laterally displaced with respect to shaft 66 the mean point or line of contact between the mating teeth on the two plates will merely shift radially outwardly of each plate within the appropriate slot 120. Mesh between the gears is maintained at all times and hence during the lateral displacement the two shafts will continue to rotate in synchronism as provided by the mating gears.

The gears may be attached to their respective shafts in any conventional manner, as by keys or splines. One method is shown in FIGS. 3 and 5 wherein each gear has a central boss 122 thereon receiving a set screw 124 radially therein. The identical gear plates are affixed to the shafts via the set screws so that the teeth of one gear face upwardly and the teeth of the other gear face downwardly so that the teeth of one gear will always mate with the teeth of the other gear.

Figure 6:
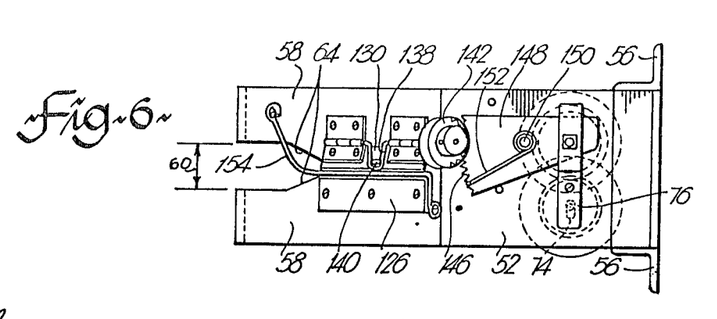

Returning to FIGS. 3, 4 and 6 the cutter means of the harvesting mechanism will now be described. As best seen in FIGS. 4 and 6 a stationary cutter plate 126 is affixed to the outer surface of one front frame portion 58 adjacent one edge of the second zone 62. The bevelled edge of plate 128 extends along the full length of zone 62. A pivotal plate 130 is hingedly affixed to the other front frame portion 58 so that the pivot axis is displaced laterally outwardly from the other edge of zone 62. A pair of simple hinges 132 may be used to mount plate 130 to the frame portion 58 and the hinge pin 136 may be connected to the plate 130 as by loop 138 and clamping screw 140 so that rotation of the pin will result in rotation of plate 130 about the pivot axis defined by the major length of pin 136. Plate 130 is provided with a longitudinally extending knife edge 134 which is cooperative with the adjacent edge of stationary plate 126 to provide a cutting action.

Rotation of the pivotal plate 130 from its open position as illustrated in FIGS. 3 to 7 to its closed, cutting position as follows. An upper extension of hinge pin 136 carries thereon a pinion gear 142. Pinion gear 142 may be provided with peripheral teeth 144 extending all, or partway around the periphery thereof. Teeth 144 engage with teeth 146 of a sector gear 148 which is pivotally mounted to upper frame portion 52 as by pivot pin 150 positioned intermediate the sector teeth 146 and the opposite end of the sector gear 148. A torsion spring 152 is mounted to pivot pin 150, and to sector gear 148 in a known manner so as to rotatably bias the sector gear to a position where, through engagement of teeth 146, 144 the pinion gear 142 has a rest position corresponding to the open position of pivotal cutter plate 130. The end of sector gear 148 opposite teeth 146 is pivotally mounted to one end of the link 76 the other end of which link, as previously discussed, rotatably retains the upper end of shaft 68.

In order to ensure that the knife edge of cutter plate 130 is protected and to avoid undesirable or premature cutting of a kelp lamina by the knife edge, a deflector 154 is provided. Deflector 154 may be in the form of a wire, bent to an appropriate configuration whereby it is connected to frame portion 58 at the upper end thereof, and it extends in close juxtaposition to the knife edge 134, along the length thereof, when the cutter plate 130 is in its open position. The knife edge can easily pass behind the bar 154 when the plate 130 swings to its cutting position. The lower end of deflector 154 is formed so as to generally follow one edge of the convergency zone 64 to its lower end which is affixed to the front frame portion 58 carrying the pivotal plate 130.

To further guide the kelp in the harvester mechanism a pair of mirror image guide members 156 may be positioned in the mechanism, one end of each guide 156 being affixed to a corresponding lower frame portion 54 with the upper end of each guide being affixed to the upper frame portion 52. The guides are positioned intermediate the front frame portions 58 and the spindles 78 and they are formed and spaced apart laterally to define guide zones generally corresponding to the zones 60, 62, 64 of the entrance guide defined by front frame portions 58. Guide members 156 may be in the form of spring loaded wire rods as shown herein or they may be brushes, rollers or plates.

Finally, as seen in FIG. 2 a plurality of separator guide plates 160 may be mounted to the harvester of the present invention with one such plate separating adjacent harvester mechanisms 48. These plates 160 extend upwardly the forward profile of the harvester to permit it to ride smoothly over obstacles and to protect the cutting mechanism. Other guide means, not shown, may be affixed to the plates 160 to kelp funnel the kelp stipes into the zone 60.

The operation of the harvester of the present invention will now be described with particular reference to FIGS. 1 and 8 through 13. FIG. 1 shows the harvester 20 approaching the kelp bed along the arrow A. As the harvester enters the kelp bed, individual kelp stipes will be directed by the appropriate guide means so that a stipe will engage a harvester mechanism 48.

Figures 8, 9, 10:
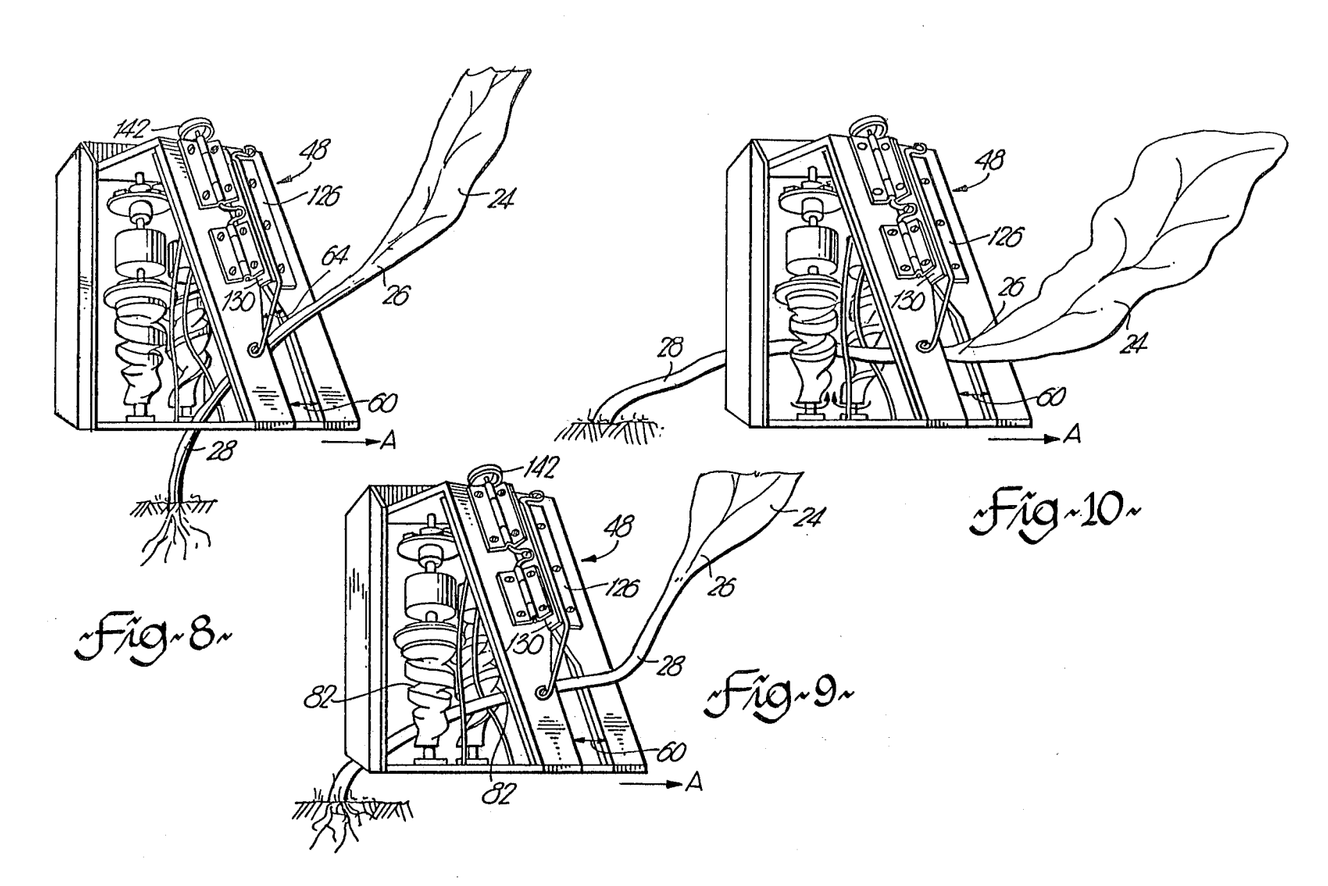
FIGS. 8–13 show the operation of the harvester mechanism.

FIG. 8 shows the initial engagement of a stipe 28 with the harvester mechanism. The stipe will enter the first zone 60 of the front frame portion 58 but the convergence zone 64 will prevent the stipe from entering the second zone 62.

As the harvester advances, FIG. 9, the stipe will be directed to enter between the spindles 78 at the lowermost, or widest, separation therebetween. The stipe engages the opposed channels 82 and friction between the stipe and the spindles causes the spindles to rotate, the spindles rotating synchronously due to the gear means 94. Continued advancement of the harvester along with continued rotation of the spindles 78, FIG. 10, causes the stipe to be carried upward by the helical channels 82 and to engage the guides 156. As shown in FIG. 10 the transition zone 26 of the kelp is approaching the harvester mechanism 48.

Figures 11, 12, 13:
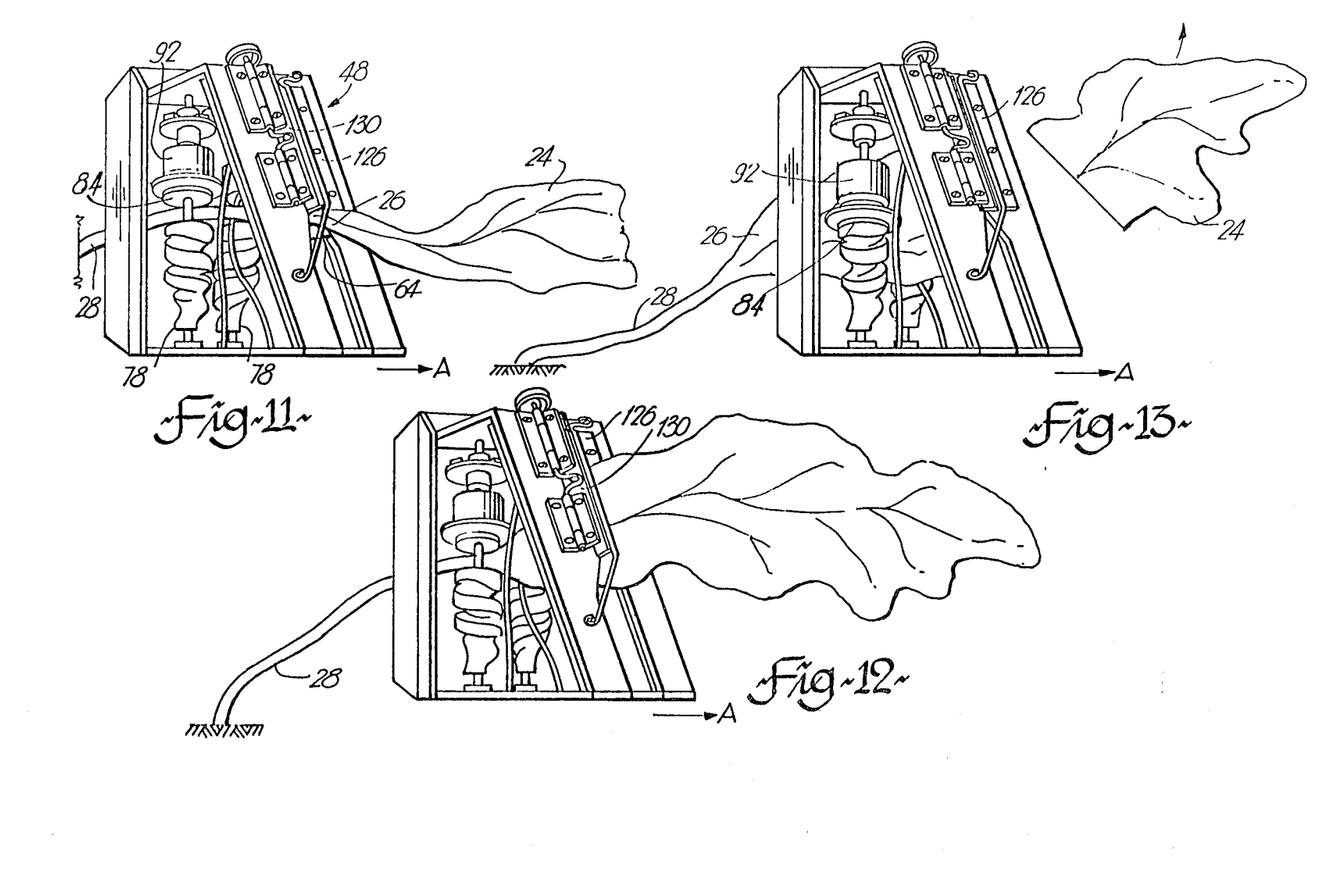

In FIG. 11 the stipe has reached the top of the spindles and has created a channel between the spindles 78 and the rollers 84, 88 due to the compressability of the spindles and the slidability of the rollers and weights 92 on their respective shafts 66, 68. As the stipe narrows towards the lamina, the transition zone and its following lamina will slide upwardly in the convergence zone 64 towards the second, cutter zone 62. The upwards displacement of the lamina in the zone 64 brings the lamina into line with the stipe as it passes through the mechanism above the spindles 78.

As the stipe narrows towards the transition zone, FIG. 12, the rollers 84, 88 descend under the bias of weights 92. The guide rods 156, which may have a spring set thereto, maintain the minor axis of the lamina vertical as the lamina approaches the rollers, the vertical orientation also permitting the lamina to enter the second zone 62 carrying the cutter plates 126, 130. At this point the pivotal plate 130 is still in its open position. The shape of the guide rods 156 is such that they will not contact the stipe until the stipe is securely gripped by the spindles 78.

FIG. 13 (and with reference to FIG. 7) shows the completed severing step. As the harvester advances, the vertically oriented kelp lamina is forced between the rollers 84, 88 and this action cams the roller 88 away from the roller 84 due to engagement of the flange 86 with the kelp passing thereby. This camming action initiates the desired lateral movement of the shaft 68 relative to the vertically fixed shaft 66. The lateral movement of the upper end of shaft 68, limited by slot 74 in upper frame portion 52 causes coincident lateral movement of link 76 and a pivoting action of sector gear 148 connected thereto. This pivoting action is transmitted via gear teeth 146, 144 to pinion 142 which in turn rotates hinge pin 136 so as to pivot cutter plate 130 towards its cutting position adjacent stationary plate 126. As the plate 130 engages the lamina it will stop passage of the lamina and the lamina will be severed across by the knife edge 134. The major portion of the lamina is set free and the forward movement of the harvester is such that it will pass below the severed lamina which in turn will be collected in the basket 38.

Once the unsevered portion of the lamina has passed the rollers 84, 88 the action of torsion spring 152 will cause reverse rotation of the sector gear 148, thereby opening cutter plate 130 through pinion 142 and restoring shaft 68 to its upright position parallel to shaft 66 and with flange 86 engaging recess 90.

The operation of each harvester mechanism is as described above. It is seen that the harvester of the present invention results in the harvesting of only the lamina portion of the kelp plants, leaving the rest of the plant unharmed so that new growth thereon can be achieved. A greater return for the kelp farmer is achieved through greater efficiency in the harvesting operation and plant conservation without undue waste is also achieved.

It is understood that the foregoing description provides the best method and means of carrying out the present invention. It is also possible that certain modifications or variations in the invention could be effected without departing from the spirit thereof. For example, a positive drive means could be provided for the spindles without affecting the operation of the invention. Also, the spindles could be radially compressible as well as or instead of being axially compressible in order to perform the function of capturing, securing and raising stipes of different diameters without damaging the stipes. The ridges defining the helical surface 80 could be formed of a rigid material and spaced a fixed distance apart, with the spaces between the ridges being filled by a foam rubber material or the like to engage the stipe.

Figure 14:
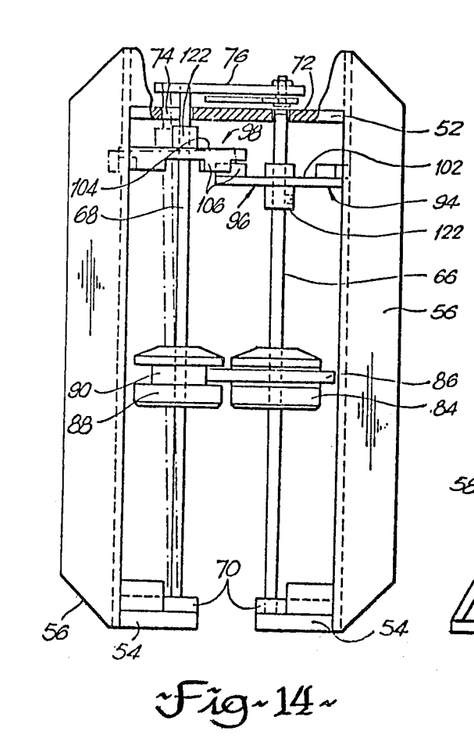
FIG. 14 is a view similar to FIG. 5 showing a harvester mechanism without spindles.
Figures 15, 16:
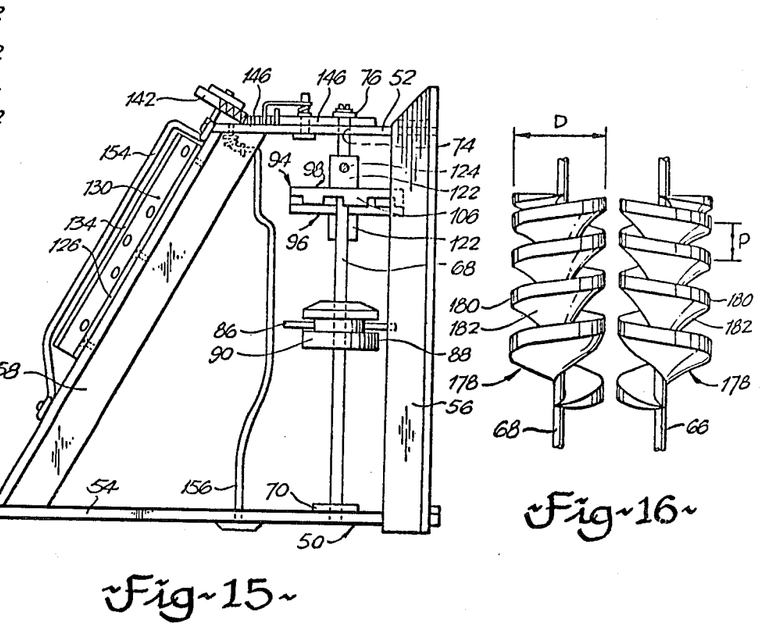
FIG. 15 is a view similar to FIG. 3 showing the harvester mechanism of FIG. 14 in a side view.
FIG. 16 illustrates a pair of spindles having a constant diameter.

In addition to, or in place of, the foregoing modifications it is also possible to modify the harvester of the present invention as illustrated in FIGS. 14, 15 and 16. FIG. 16 illustrates an alternative spindle structure wherein each spindle 178 has a constant diameter D with a helical surface 180 defining helical channels 182 therein. As with spindles 78 the spindles 178 are formed of a soft flexible material and they are affixed to the shafts 66, 68 only adjacent the lower end thereof to permit axial compression thereof during operation. In contrast to the spindles 78 in which the helix is essentially of constant pitch but of increasing diameter from bottom to top, the spindles 178 are of constant diameter and the helix has a decreasing pitch P from bottom to top. Spindles 178 are somewhat easier to manufacture than spindles 78 and they are effective over a wider range of stipe diameters than spindles 78. Harvesters using spindles 178 should also show increased efficiency over harvesters using spindles 78. The operation of a harvester using spindles 178 is identical to the operation of a harvester using spindles 78.

FIGS. 14 and 15 illustrate a harvester mechanism primarily adapted for the harvesting of kelp having a fairly rigid stipe, such as *Laminaria hyperborea*, although the embodiment of these Figures can still be used for harvesting kelp having a flexible stipe. The efficiency however in the latter case would be less than that achievable with a harvester using spindles 78 or 178.

The main difference between the embodiment of FIGS. 14, 15 and the preceding embodiments lies in the deletion of the spindles 78 or 178 and the attendent biassing means (weights 92). Thus the shafts 66, 68 only carry the gears 96, 98 (which, in fact may also be deleted) and the mating rollers 84, 88. As a harvester according to this embodiment passes through a kelp bed having rigid-stiped kelp, the resistance of the stipe to bending over in the path of the harvester will induce the lamina to enter the cutter zone 62. As the lamina passes between the rollers 84, 88 the necessary lateral movement of the shaft 68 is achieved and the cutter mechanism is activated as in the previous embodiments to sever the lamina.

Since there is no necessity of movement of the rollers along the shafts they may be affixed directly thereto. Also since the spindles have been deleted, it would also be possible to delete the gears 96, 98 as the necessity of matched, opposite rotation of the shafts 66, 68 is no longer there, rotation being induced satisfactorily by passage of the lamina between the rollers 84, 88.

I claim:

1. A harvester mechanism comprising:
   (a) a frame;
   (b) a pair of helical spindles, each mounted on a shaft adjacent each other in said frame;
   (c) gear means connected to said shafts for ensuring opposite rotation of one spindle relative to the other spindle;
   (d) one of said shafts being mounted in said frame so that one end of said one shaft is laterally movable relative to the other shaft;
   (e) cutter means mounted in said frame; and
   (f) linkage means interconnecting the cutter means and said one end of the one shaft whereby lateral movement of said one end of the one shaft actuates said cutter means through said linkage means.

2. The mechanism of claim 1 wherein said helical spindles are axially compressible.

3. The mechanism of claim 2 and including a cylindrical roller on each said shaft adjacent one end of the helical spindle.

4. The mechanism of claim 3 wherein one roller has at least one circumferential recess in its outer surface and the other roller has at least one annular flange on its outer surface, said flange mating with said recess.

5. The mechanism of claim 4 including means biassing each roller axially towards its adjacent helical spindle.

6. The mechanism of claim 5 wherein said biassing means includes a weight axially slidable on the shaft and in contact with the adjacent roller.

7. The mechanism of claim 5 wherein said biassing means includes a compression spring concentrically mounted on the shaft between the frame and the adjacent roller.

8. The mechanism of claim 3 wherein the helix of each spindle decreases in diameter from said one end to the other, the helices being of opposite hand.

9. The mechanism of claim 8 wherein adjacent surfaces of said helices are spaced apart at said one end of said spindles and converge towards the other end of said spindles.

10. The mechanism of claim 3 wherein the helix of each spindle increases in pitch from said one end to the other the helices being of opposite hand and the diameter of each spindle being essentially constant from one end to the other.

11. The mechanism of claim 1 wherein said gear means includes a first cylindrical plate on one of said shafts and having on one radial surface thereof a plurality of circumferentially spaced teeth, a second cylindrical plate on the other of said shafts, said second plate being axially spaced from said first plate and having a plurality of circumferentially spaced teeth on the surface thereof facing said one surface of said first plate, a portion of said second plate overlying a portion of said first plate whereby the teeth on said second plate are engageable with the teeth on said first plate.

12. The mechanism of claim 11 wherein each of said plates carries an equal number of teeth, each tooth being generally triangular in plan with one side thereof lying along the periphery of the plate and the apex opposite said side lying on a radius of the plate.

13. The mechanism of claim 12 wherein each plate carries an even number of teeth with each tooth being diametrically opposed to another tooth.

14. The mechanism of claim 13 wherein the adjacent sides of adjacent pairs of teeth are parallel and are collinear with adjacent sides of opposed pairs of adjacent teeth.

15. A harvester mechanism comprising:
   (a) a frame;
   (b) a pair of generally parallel, shafts rotatably mounted adjacent each other in said frame;
   (c) a cylindrical roller mounted on one shaft in close juxtaposition to a cylindrical roller mounted on the other shaft;
   (d) said one shaft being mounted in said frame so that one end of said one shaft is laterally movable relative to said other shaft;
   (e) cutter means mounted in said frame; and
   (f) linkage means interconnecting the cutter means and said one end of the one shaft whereby lateral movement of said one end of the one shaft actuates said cutter means through said linkage means.

16. The mechanism of claim 15 wherein one roller has at least one circumferential recess in its outer surface and the other roller has at least one annular flange on its outer surface, said flange mating with said recess.

17. The mechanism of claim 1 or 15 whereby said frame includes an entrance guide having a first open zone, a second open zone of width less than said first zone and a convergence zone leading from said first zone to said second zone, said cutter means including a stationary plate mounted on said guide along one edge of said second zone and a pivotal plate having a knife edge and hinged to said guide along the other edge of said second zone for pivoting from an open position to a cutting position adjacent said stationary plate.

18. The mechanism of claim 17 wherein said linkage means includes a link connected to the one end of the one shaft and to one end of a sector gear pivotally mounted in said frame intermediate the one end thereof and the gear teeth thereon, and a pinion gear meshing with said sector gear and connected to one end of a hinge pin connected to said pivotal plate.

19. The mechanism of claim 17 or 18 and including a pair of mirror image guide members in said frame adjacent said entrance guide, said guide members being spaced apart to define zones therebetween generally corresponding to the zones of said entrance guide.

20. The mechanism of claim 17 or 18 and including deflector means on said frame, the knife edge of said pivotal plate being protected by said deflector means when said pivotal plate is in its open position.

21. A harvester for harvesting kelp laminae, the kelp including a holdfast fixed to the bottom of a body of water, a stipe and a lamina connected to the stipe by a transition zone, comprising:
   (a) a basket having at least one open end for collecting harvested laminae;
   (b) a plurality of harvesting mechanisms attached to said basket along a lower leading edge at said open end, each mechanism comprising:
       (i) a frame;
       (ii) a pair of parallel rotatable generally upright shafts mounted in said frame, one end of one shaft being movable laterally relative to the other shaft;
       (iii) a spindle mounted on each shaft for rotation therewith, each spindle having a helical surface, the helices being of opposite hand;
       (iv) gear means connected to said shafts for ensuring opposite rotation of one spindle relative to the other spindle;
       (v) cutter means mounted in said frame; and
       (vi) linkage means interconnecting said cutter means and said one end of said one shaft such that lateral movement thereof actuates said cutter means via said linkage means;

whereby as said harvester moves along the sea bottom and a kelp stipe enters between said spindles, the stipe will contact said spindles and cause rotation of said spindles to move said stipe upwardly along the helical surfaces thereof, entrance of the kelp lamina between said spindles effecting said lateral movement of said one shaft to actuate said cutter means and hence sever the lamina above the transition zone, the severed lamina being collected in said basket.

22. The harvester of claim 21 wherein said spindles are axially compressible and each of said shafts has a cylindrical roller thereon adjacent the upper end of the spindle thereon, each roller having its outer peripheral surface in close juxtaposition to the other peripheral surface of the other roller.

23. The harvester of claim 22 wherein one roller has at least one circumferential recess in its outer surface and the other roller has at least one annular flange on its outer surface, said flange mating with said recess.

24. The harvester of claim 23 including means biassing each roller axially towards its adjacent helical spindle.

25. The harvester of claim 24 wherein said biassing means includes a weight axially slidable on the shaft and in contact with the adjacent roller.

26. The harvester of claim 24 wherein said biassing means includes a compression spring concentrically mounted on the shaft between the frame and the adjacent roller.

27. The harvester of claim 21 wherein said gear means includes a first cylindrical plate on one of said shafts and having on one radial surface thereof a plurality of circumferentially spaced teeth, a second cylindrical plate on the other of said shafts, said second plate being axially spaced from said first plate and having a plurality of circumferentially spaced teeth on the surface thereof facing said one surface of said first plate, a portion of said second plate overlying a portion of said first plate whereby the teeth on said second plate are engageable with the teeth on said first plate.

28. The harvester of claim 27 wherein each plate carries an equal number of teeth, each tooth being generally triangular in plan with one side thereof lying along the periphery of the plate and the apex opposite said side lying on a radius of the plate.

29. The harvester of claim 28 wherein each plate carries an even number of teeth with each tooth being diametrically opposed to another tooth.

30. The harvester of claim 29 wherein the adjacent sides of adjacent pairs of teeth are parallel and are collinear with adjacent sides of opposed pairs of adjacent teeth.

31. A harvester for harvesting kelp laminae, the kelp including a holdfast fixed to the bottom of a body of water, a stipe and a lamina connected to the stipe by a transition zone, comprising:
(a) a basket having at least one open end for collecting harvested laminae;
(b) a plurality of harvesting mechanisms attached to said basket along a lower leading edge at said open end, each mechanism comprising:
(i) a frame;
(ii) a pair of parallel rotatable generally upright shafts mounted in said frame, one end of one shaft being movable laterally relative to the other shaft;
(iii) a cylindrical roller mounted on the one shaft in close juxtaposition to a cylindrical roller mounted on the other shaft;
(iv) cutter means mounted in said frame; and
(v) linkage means interconnecting said cutter means and said one end of said one shaft such that lateral movement thereof actuates said cutter means via said linkage means;

whereby as said harvester moves along the sea bottom and a kelp stipe and lamina enters between said shafts, the lamina will enter between said rollers, thereby effecting said lateral movement of said one shaft to actuate said cutter means and hence sever the lamina above the transition zone, the severed lamina being collected in said basket.

32. The harvester of claim 31 wherein one roller has at least one circumferential recess in its outer surface and the other roller has at least one annular flange on its outer surface, said flange mating with said recess.

33. The harvester of claim 21 or 31 wherein said frame includes an entrance guide having a first open zone, a second open zone of width less than said first zone and a convergence zone leading from said first zone to said second zone, said cutter means including a stationary plate mounted on said guide along one edge of said second zone and a pivotal plate having a knife edge and hinged to said guide along the other edge of said second zone for pivoting from an open position to a cutting position adjacent said stationary plate.

34. The harvester of claim 33 wherein said linkage means includes a link connected to the one end of the one shaft and to one end of a sector gear pivotally mounted in said frame intermediate the one end thereof and the gear teeth thereon, and a pinion gear meshing with said sector gear and connected to one end of a hinge pin connected to said pivotal plate.

35. The harvester of claim 33 or claim 34 including a pair of mirror image guide members in said frame adjacent said entrance guide, said guide members being spaced apart to define zones therebetween generally corresponding to the zones of said entrance guide.

36. The harvester of claim 33 or claim 34 including deflector means on said frame, the knife edge of said pivotal plate being protected by said deflector means when said pivotal plate is in its open position.

37. A harvester for harvesting kelp, the kelp including a holdfast rooted to the sea bottom, a stipe and a lamina connected to the stipe by a transition zone, comprising:
(a) a basket having at least one open end for collecting harvested laminae;
(b) means for connecting said basket to a vessel providing movement of said basket adjacent the sea bottom; and
(c) a plurality of harvesting mechanisms attached to said basket along a lower leading edge at said open end, each mechanism comprising:
(i) a frame;
(ii) an entrance guide along a leading portion of said frame, said guide having a first open zone of a width greater than that of a mature kelp stipe, a second open zone above said first zone of a reduced width less than that of a mature kelp stipe but greater than the thickness of a kelp lamina, and a convergence zone connecting said first and second zones;
(iii) a pair of parallel, rotatable, generally upright shafts mounted in said frame behind said guide, one end of one shaft being movable laterally relative to the other shaft;

(iv) an axially compressible spindle mounted on each shaft for rotation therewith, each spindle having a helical surface, the helices being of opposite hand;

(v) gear means connected to said shafts for ensuring opposite rotation of one spindle relative to the other spindle;

(vi) cutter means including a stationary plate mounted on said guide adjacent one edge of said second zone, and a pivotal plate having a knife edge and hinged to said guide adjacent the other edge of said second zone for pivoting from an open position to a cutting position adjacent said stationary plate; and (vii) linkage means interconnecting said one end of said one shaft and said cutter means, said linkage means including a link connected at one end to said one end of said one shaft and at the other end to one end of a sector gear, and a pinion gear mounted on a pin connected to said pivotal plate, said sector gear having the teeth thereof meshing with said pinion gear and being mounted to said frame for pivoting on an axis intermediate the one end thereof and the teeth thereon, such that lateral movement of the one end of the one shaft causes pivoting of said sector gear about its axis and consequent rotation of said pinion gear and said pivotal plate;

whereby as said harvester moves along the sea bottom and a kelp stipe enters said first zone of said guide it will contact said spindles to cause rotation thereof which moves the stipe upwardly along the helical surfaces thereof and then maintains the stipe in an upwardly displaced position until the kelp transition zone and the lamina enter the second zone of the guide, entrance of the kelp lamina between the spindles effecting said lateral movement of said one shaft to rotate said pivotal plate towards said stationary plate and to hence sever the lamina a short distance above the kelp transition zone, the severed lamina being collected in said basket.

38. The mechanism of claim 37 wherein the helix of each spindle decreases in diameter from said one end to the other, the helices being of opposite hand.

39. The mechanism of claim 37 wherein the helix of each spindle increases in pitch from said one end to the other, the helices being of opposite hand and the diameter of each spindle being essentially constant from one end to the other.

40. A harvester for harvesting kelp, the kelp including a holdfast rooted to the sea bottom, a stipe and a lamina connected to the stipe by a transition zone, comprising:

(a) a basket having at least one open end for collecting harvested laminae;

(b) means for connecting said basket to a vessel providing movement of said basket adjacent the sea bottom; and (c) a plurality of harvesting mechanisms attached to said basket along a lower leading edge at said open end, each mechanism comprising:
 (i) a frame;
 (ii) an entrance guide along a leading portion of said frame, said guide having a first open zone of a width greater than that of a mature kelp stipe, a second open zone above said first zone of a reduced width less than that of a mature kelp stipe but greater than the thickness of a kelp lamina, and a convergence zone connecting said first and second zones;
 (iii) a pair of parallel, rotatable, generally upright shafts mounted in said frame behind said guide, one end of one shaft being movable laterally relative to the other shaft;
 (iv) a cylindrical roller mounted on said one shaft in close juxtaposition to a cylindrical roller mounted on the other of said shafts;
 (v) cutter means including a stationary plate mounted on said guide adjacent one edge of said second zone, and a pivotal plate having a knife edge and hinged to said guide adjacent the other edge of said second zone for pivoting from an open position to a cutting position adjacent said stationary plate; and
 (vi) linkage means interconnecting said one end of said one shaft and said cutter means, said linkage means including a link connected at one end of said one end of said one shaft and at the other end to one end of a sector gear, and a pinion gear mounted on a pin connected to said pivotal plate, said sector gear having the teeth thereof meshing with said pinion gear and being mounted to said frame for pivoting on an axis intermediate the one end thereof and the teeth thereon, such that lateral movement of the one end of the one shaft causes pivoting of said sector gear about its axis and consequent rotation of said pinion gear and said pivotal plate;

whereby as said harvester moves along the sea bottom and a kelp stipe and lamina enters between said shafts, the stipe will contact said rollers to cause rotation thereof until the kelp transition zone and the lamina enter between the rollers, entrance of kelp lamina between the rollers effecting said lateral movement of said one shaft to rotate said pivotal plate towards said stationary plate and to hence sever the lamina a short distance above the kelp transition zone, the severed lamina being collected in said basket.

41. The mechanism of claim 18, 34, 37 or 40 and including a torsion spring connected to said sector gear and to a pin pivotally mounting said sector gear to bias said sector gear to a position whereby said one shaft, through said link, is biased to a position parallel to the other shaft.

* * * * *